United States Patent [19]

Shimizume et al.

[11] Patent Number: 5,475,664
[45] Date of Patent: Dec. 12, 1995

[54] FOCUS SERVO CIRCUIT APPARATUS WITH AUTOMATIC BIAS ADJUSTMENTS

[75] Inventors: Kazutoshi Shimizume; Mamoru Akita, both of Kanagawa; Shigeru Inohana, Tokyo; Hidenobu Noda, Kanagawa, all of Japan

[73] Assignee: Sony Corporation, Tokyo, Japan

[21] Appl. No.: 410,863

[22] Filed: Mar. 16, 1995

Related U.S. Application Data

[63] Continuation of Ser. No. 193,423, Feb. 3, 1994, abandoned.

[30] Foreign Application Priority Data

Feb. 5, 1993 [JP] Japan ................................. 5-042137

[51] Int. Cl.$^6$ .................................................. G11B 7/095
[52] U.S. Cl. .................................. 369/44.29; 369/44.34; 369/54
[58] Field of Search ........................... 369/44.11, 44.25, 369/44.26, 44.29, 44.34–44.36, 54, 58

[56] References Cited

U.S. PATENT DOCUMENTS

| | | | |
|---|---|---|---|
| 4,755,980 | 7/1988 | Yoshimaru et al. | 369/54 |
| 5,187,696 | 2/1993 | Ishii et al. | 369/44.35 X |
| 5,268,888 | 12/1993 | Terada | 369/44.35 X |
| 5,283,774 | 2/1994 | Mashimo | 369/44.35 X |

FOREIGN PATENT DOCUMENTS

4102857A1 8/1992 Germany.

OTHER PUBLICATIONS

G. Bouwhuis, J. Braat, A. Huijser, J. Pasman, G. Van Rosmalen and K. Schouhamer Immink: "Principles of Optical Disc Systems", Philips Research Laboratories, Eindhoven; Bristol, Great Britain, Adam Hilger, Ltd., 1986, pp. 58–64.

Primary Examiner—W. R. Young
Attorney, Agent, or Firm—Limbach & Limbach; Philip M. Shaw, Jr.

[57] ABSTRACT

In a recording and reproducing apparatus of CD or the like, it is adapted such that the time difference between an edge of a PLL clock synchronized with an EFM signal and a transition point of the EFM signal is measured in a time difference measuring circuit, a focus bias voltage to bring the time difference to a minimum is established in a bias voltage generator, the established focus bias voltage is added in an adder to a focus error signal generated in a focus error signal generator, and, thereby, the focus bias is automatically adjusted and focus servo is executed in accordance with the bias-adjusted focus error signal.

8 Claims, 10 Drawing Sheets

FOCUS SERVO CIRCUIT APPARATUS WITH AUTOMATIC BIAS ADJUSTMENTS

This is a continuation application of application Ser. No. 08/193,423 filed on Feb. 3, 1994, abandoned.

BACKGROUND OF THE INVENTION

1. Field of the Invention

The present invention relates to a focus servo circuit and, more particularly, to a focus servo circuit suitable for use in the servo system of optical disk players such as CD (Compact Disk) players.

2. Description of the Related Art

A focus servo circuit is indispensable to optical disk players, for example CD players, which focus servo circuit executes control while the disk is rotated to keep the distance between the objective lens incorporated in the pickup and the signal surface of the disk constant against vertical movements of the signal surface of the disk due to a warp or the like of the disk.

Figure 1:
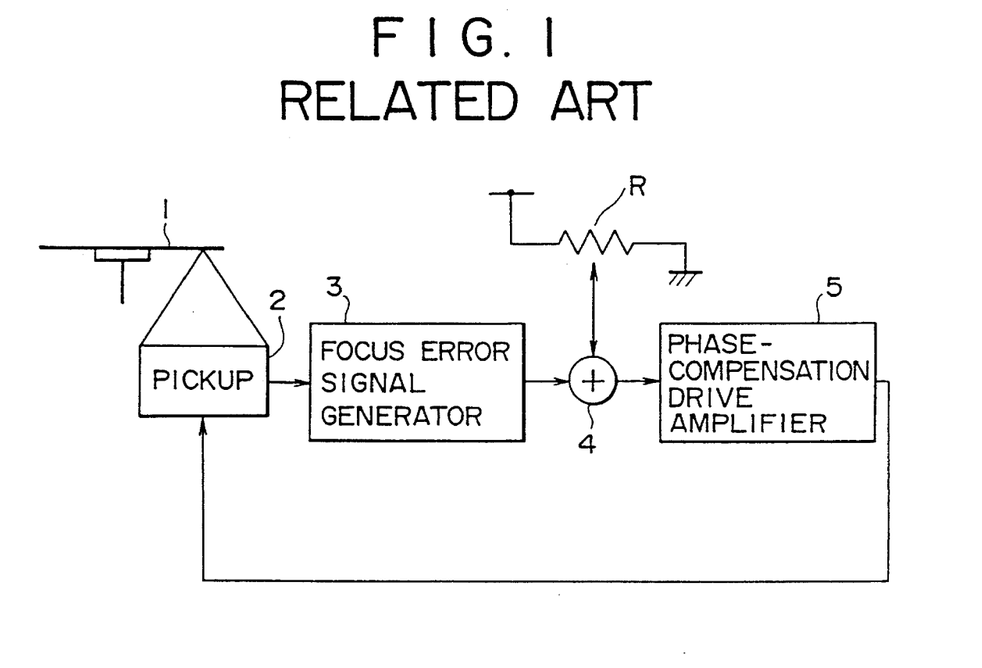
FIG. 1 is a block diagram showing a focus servo circuit of a related art.

An example of a focus servo circuit of the related art is shown in FIG. 1, in which a pickup 2 optically reading signal information on a disk I supplies an output of a focus servo system to a focus error signal generator 3.

In the focus error signal generator 3, a focus error signal, which, after offset adjustments are made by an adder 4, becomes zero when the signal surface of the disk lies on the focal plane of the optic system, becomes minus (or plus) when the signal surface comes closer to the objective lens, and becomes plus (or minus) when the signal surface goes away from the objective lens, is generated according to a known method such as the astigmatic method.

The focus error signal, after being passed through an adder 4, is compensated for phase in a phase compensation drive amplifier 5 and supplied to a focus actuator, within the pickup 2, as its drive signal.

Figure 2:
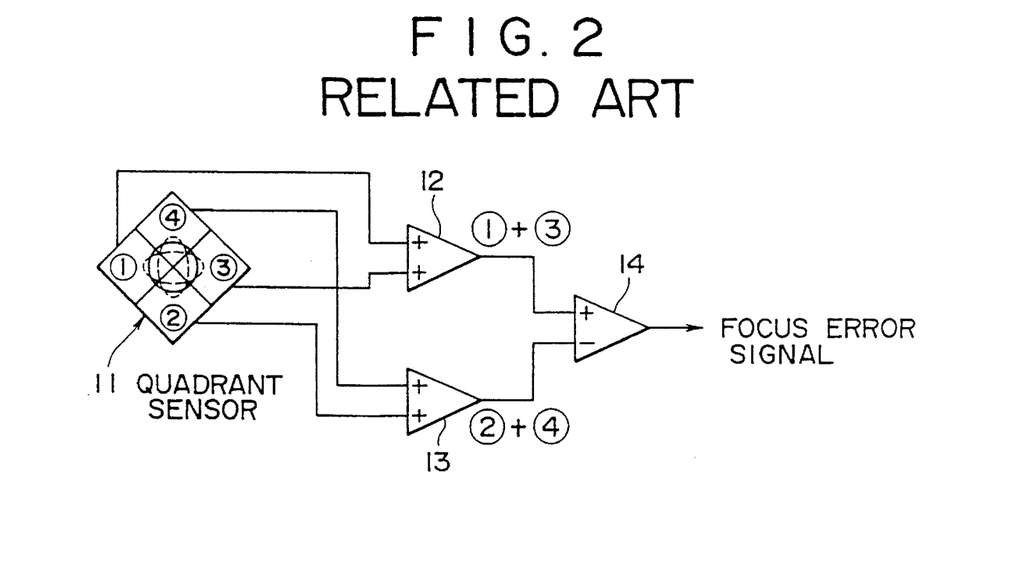
FIG. 2 is a block diagram explanatory of the principle of an astigmatic method of a related art.

When for example the astigmatic method is used as the method of generating the focus error signal in the focus error signal generator 3, a quadrant sensor 11 having its photosensing surface divided into four parts is used as the photosensor in the pickup 2 as shown in FIG. 2. Outputs of the photosensing parts (1) and (3), and (2) and (4), both diagonally disposed, are added in adders 12 and 13, respectively, and the added outputs are then subjected to subtraction in a subtractor 14, and thereby a focus error signal is generated. Because of such structure, if there are variations in sensitivity among the photosensing parts (1) to (4) of the quadrant sensor 11, or if there are some offsets in the circuit systems such as the adders, it sometimes occurs that a component related to the offset is produced in the focus error signal, and hence, even when the signal surface of the disk is on the focal plane, the focus error signal does not become zero.

If the focus servo is carried out in the described state, a defocus corresponding to the component related to the offset is produced and therefore it becomes impossible to read well the signal information on the disk.

Therefore, it has so far been practiced to generate a bias voltage using a semi-fixed resistor R and add this bias voltage to the focus error signal in the adder 4 to thereby cancel the component related to the offset and achieve offset adjustments of focus servo to bring about a just-in-focus state.

The bias adjustment of the focus servo has been carried out in the production line such that the position of the pit on the disk comes into focus, i.e., such that the eye pattern of an RF signal output from the pickup 2 becomes cleanest in the waveform observation.

In the focus servo circuit of the related art of the described structure, however, the bias adjustment of the focus servo in the production line has been made manually. Therefore, there have been such problems that the adjustment retires skill and time and, in addition, the focusing will not be accurate if, due to variations in thickness or material, the refractive index of the disk actually reproduced differs from that of the disk used in performing the bias adjustment.

OBJECT AND SUMMARY OF THE INVENTION

The present invention has been made in view of the above mentioned problems. Accordingly, it is an object of the present invention to provide a focus servo circuit capable of making bias adjustments of the focus servo automatically and most suitably for each reproduced disk.

A focus servo circuit according to the invention comprises a focus error signal generator for generating a focus error signal, a time difference measuring circuit for measuring a time difference between an edge of a clock synchronized with a digital signal reproduced from a disk and a transition point of the digital signal, a bias voltage generator for generating a focus bias voltage determined by the measured time differences, and an adder for adding the focus bias voltage to the focus error signal, and in which it is adapted such that focus servo is carried out using the output from the adder.

With the described arrangement, the time difference between an edge of a clock synchronized with a digital signal and a transition point of the digital signal is measured. Since this time difference is indicative of focus bias error, the focus bias voltage is established so that the time difference is minimized.

The established focus bias voltage is added to the focus error signal. Thereby, a DC offset component contained in the focus error signal is canceled, and thus, automatic adjustments to bring a focus biased state into a just-in-focus state can be achieved.

BRIEF DESCRIPTION OF THE DRAWINGS

FIGS. 4A and 4B are waveform diagrams showing the superimposed RF signals of several different pit sequences of the disk and a PLL clock in the servo circuit shown in FIG. 3, of which FIG. 4A shows them in a just-in-focus state and FIG. 4B shows them in an out-of-focus state;

FIGS. 5A and 5B are waveform diagrams showing the binarized EFM signals corresponding to the RF signals in FIG. 4 and the PLL clock, of which FIG. 5A shows them in a just-in-focus state and FIG. 5B shows them in an out-of-focus state;

FIGS. 8a to 8f are waveform diagrams for signals in various parts of the time difference measuring circuit shown in FIG. 7;

DETAILED DESCRIPTION OF THE PREFERRED EMBODIMENTS

An embodiment of the present invention will be described below in detail with reference to the accompanying drawings.

Figure 3:
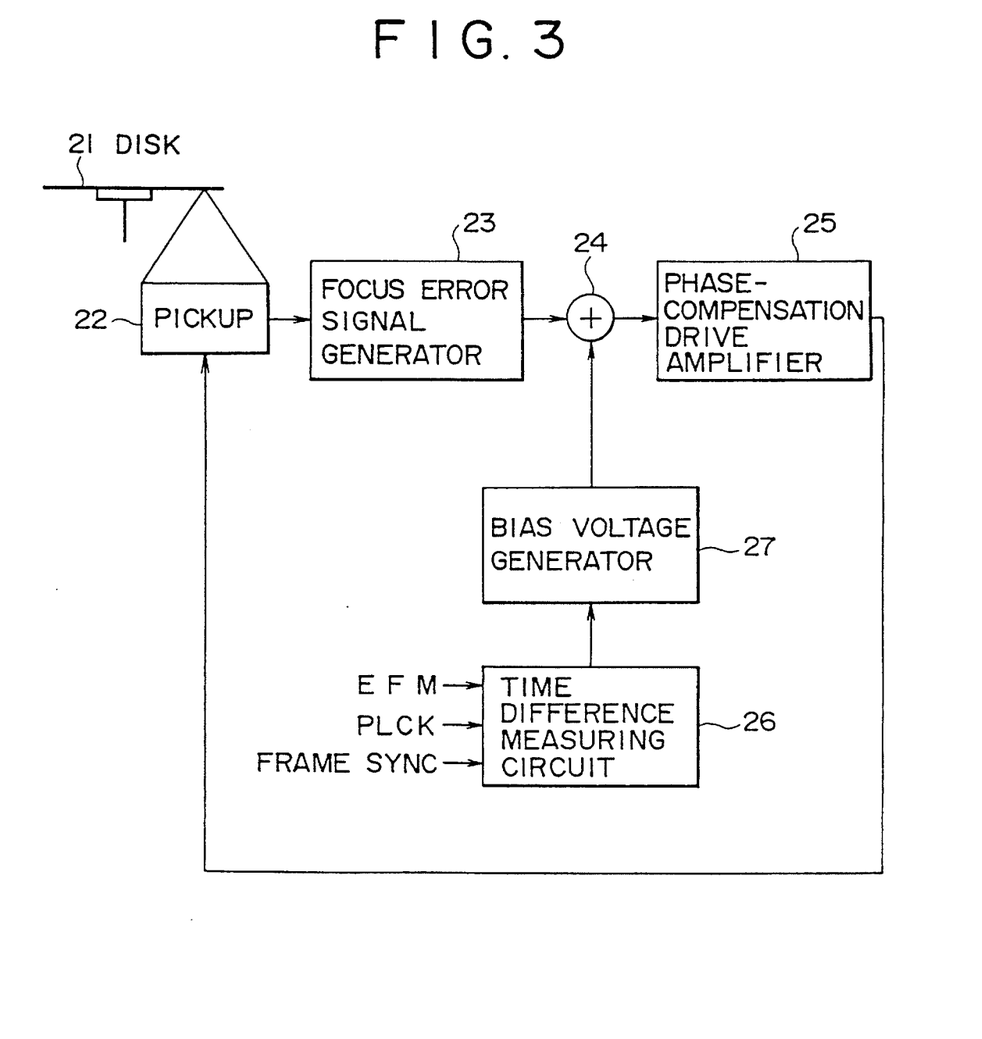
FIG. 3 is a block diagram showing a first embodiment of a focus servo circuit according to the invention.

FIG. 3 is a block diagram showing a first embodiment of a focus servo circuit according to the invention applied a CD player.

Referring to FIG. 3, there is recorded signal information as a pit string on the signal surface of a disk 21. The signal information on the disk 21 is optically read by a pickup 22.

An RF signal output from the pickup 22 is supplied to a PLL circuit, not shown, and used for generation of a PLL clock PLCK synchronized with the RF signal and also supplied to a digital signal processing system, not shown, and subjected to signal processing therein such as EFM (Eight to Fourteen Modulation) demodulation and error correction, with the PLL clock PLCK used as a reference, and output therefrom as an audio signal.

A focus error signal generator 23, according to a known generating method such as the astigmatic method, generates a focus error signal, which, after offset adjustment, becomes zero when the signal surface of the disk lies on the focal plane of the optic system, becomes minus (or plus) when the signal surface comes closer to the objective lens, and becomes plus (or minus) when the signal surface goes away from the objective lens.

The focus error signal, after being passed through an adder 24, is compensated for phase in a phase-compensation drive amplifier 25 and supplied to the focus actuator, within the pickup 22, as its drive signal.

Figure 4A:
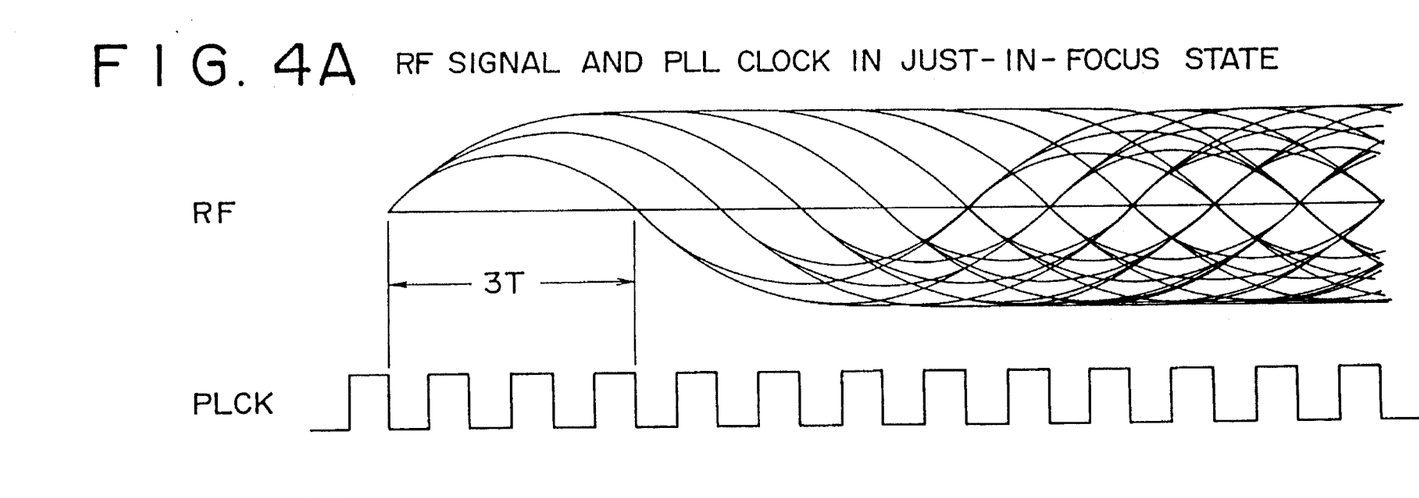
Figure 4B:
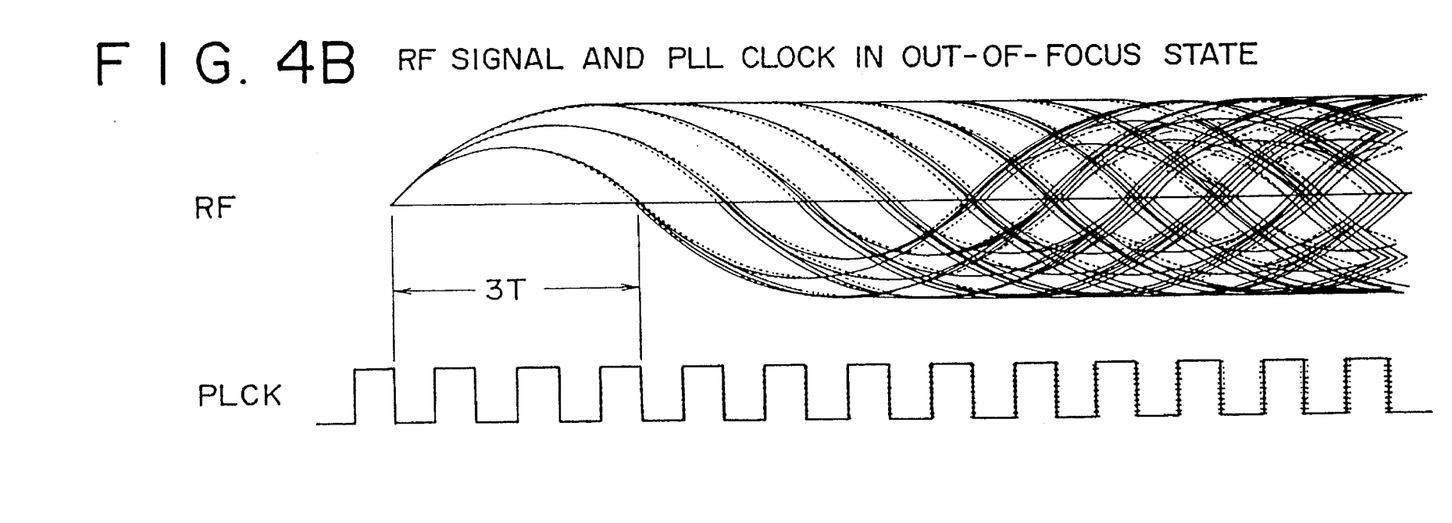

In the execution of focus servo, referring to FIG. 4, when the system is in a just-in-focus state (FIG. 4A) the RF signal takes on a clean waveform and the PLL clock PLCK also takes on a waveform free of jitters, but if the system is somewhat deviated from the just-in-focus point, i.e., if it is out of focus (FIG. 4B), the frequency spectrum of the RF signal becomes broadened electrically and the RF signal takes on a dirty waveform and, hence, the PLL clock PLCK also takes on a waveform containing jitters.

Figures 5A, 5B:
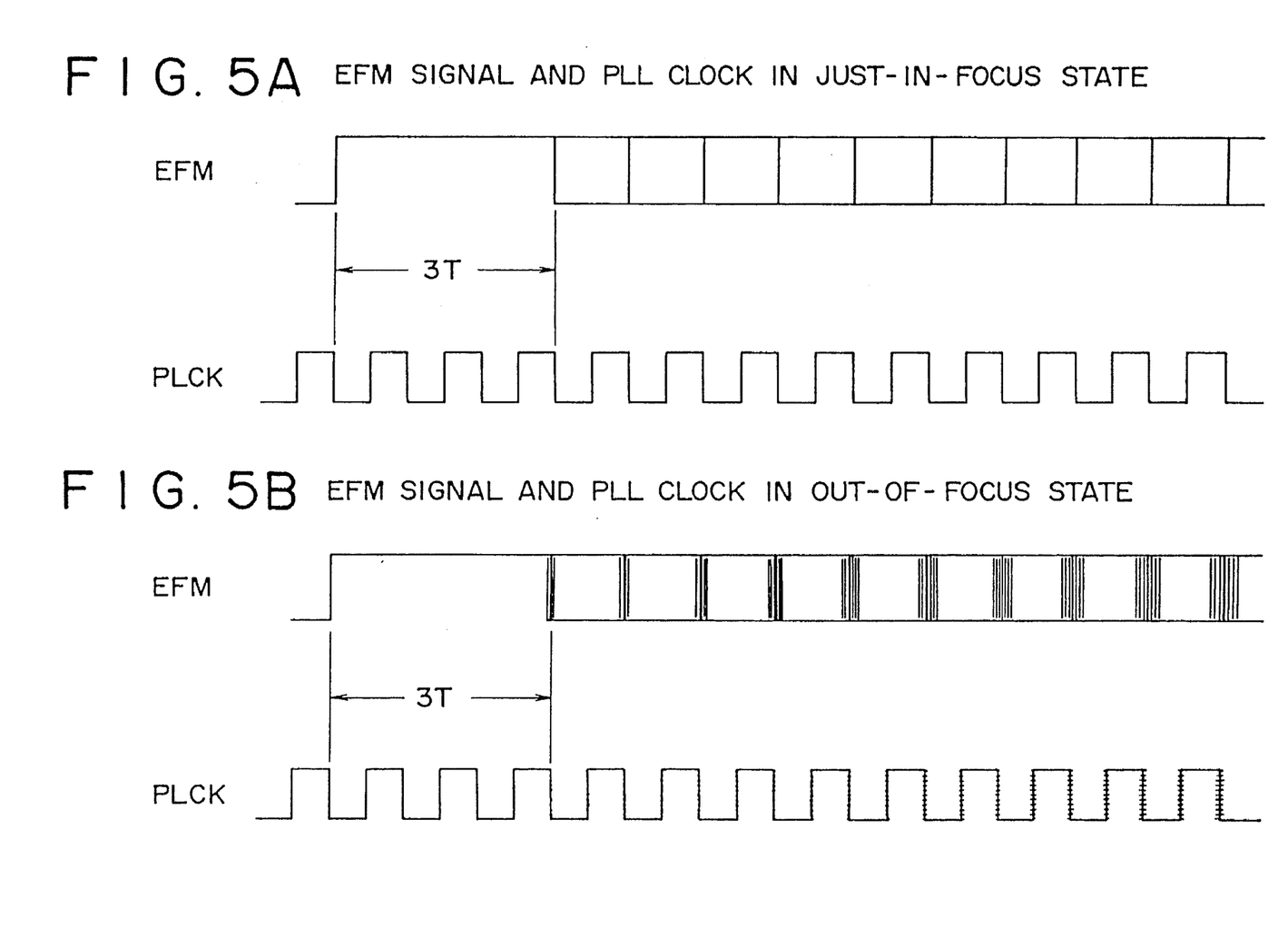

FIG. 5A and FIG. 5B show waveforms of the EFM signal as a binarized signal of the RF signal and the PLL clock PLCK corresponding to FIG. 4A and FIG. 4B, respectively.

Figure 6:
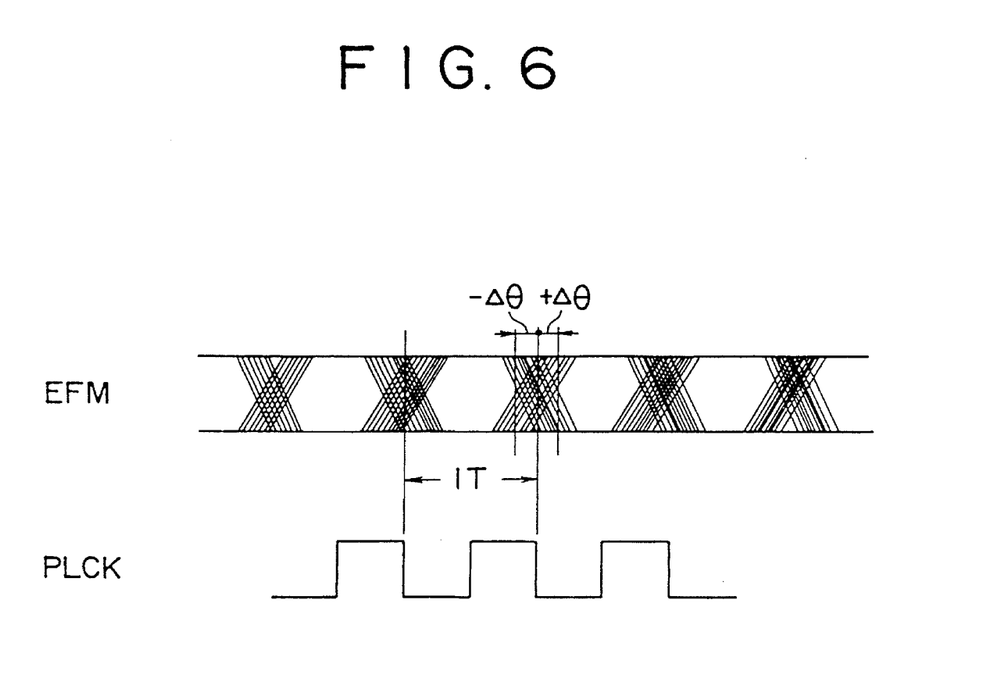
FIG. 6 is a diagram showing time differences ±Δθ between transition points of EFM signals and the PLL clock.

Accordingly, in the present invention, taking notice of the fact that the quantity of the jitters in the RF signal is minimized in the just-in-focus state, it is arranged such that the quantity of jitters corresponding to the focus bias error is measured as the time difference (phase difference) $\pm\Delta\theta$ between the edge of the PLL clock PLCK and the transition point of the EFM signal and the focus bias voltage is established to minimize the time difference $\pm\Delta\theta$ and, thereby, the bias adjustments are automatically achieved.

More specifically, referring to FIG. 3, there are provided a time difference measuring circuit 26 for measuring the time difference $\pm\Delta\theta$ between the edge of the PLL clock PLCK and the transition point of the EFM signal and a bias voltage generator 27 for generating a focus bias voltage determined by the measured time difference $\pm\Delta\theta$, and it is arranged such that the focus bias voltage is added in the adder 24 to the focus error signal to cancel the DC offset component generated in the servo system and, thereby, the bias adjustments are achieved.

The time difference measuring circuit 26 takes a predetermined length of time as a reference and counts the number of jitters, each of which has a duration which is over the reference time ($\pm$Tref), occurring in one period (=136 μsec.) of the frame sync signal, and measures the count value as the time difference $\pm\Delta\theta$.

As the above reference time ($\pm$Tref), the time N/8 times as large as the period of the PLL clock PLCK (=4.3218 MHz) is chosen. When, for example, N= 3 is set, the time given below is taken as the reference:

$$Tref=(1/(4.3218 \text{ MHz}\times 8))\times 3\approx 88 \text{ nsec.} \qquad (1)$$

The value of N is not limited to 3 but can be set to any desired value.

Figure 7:
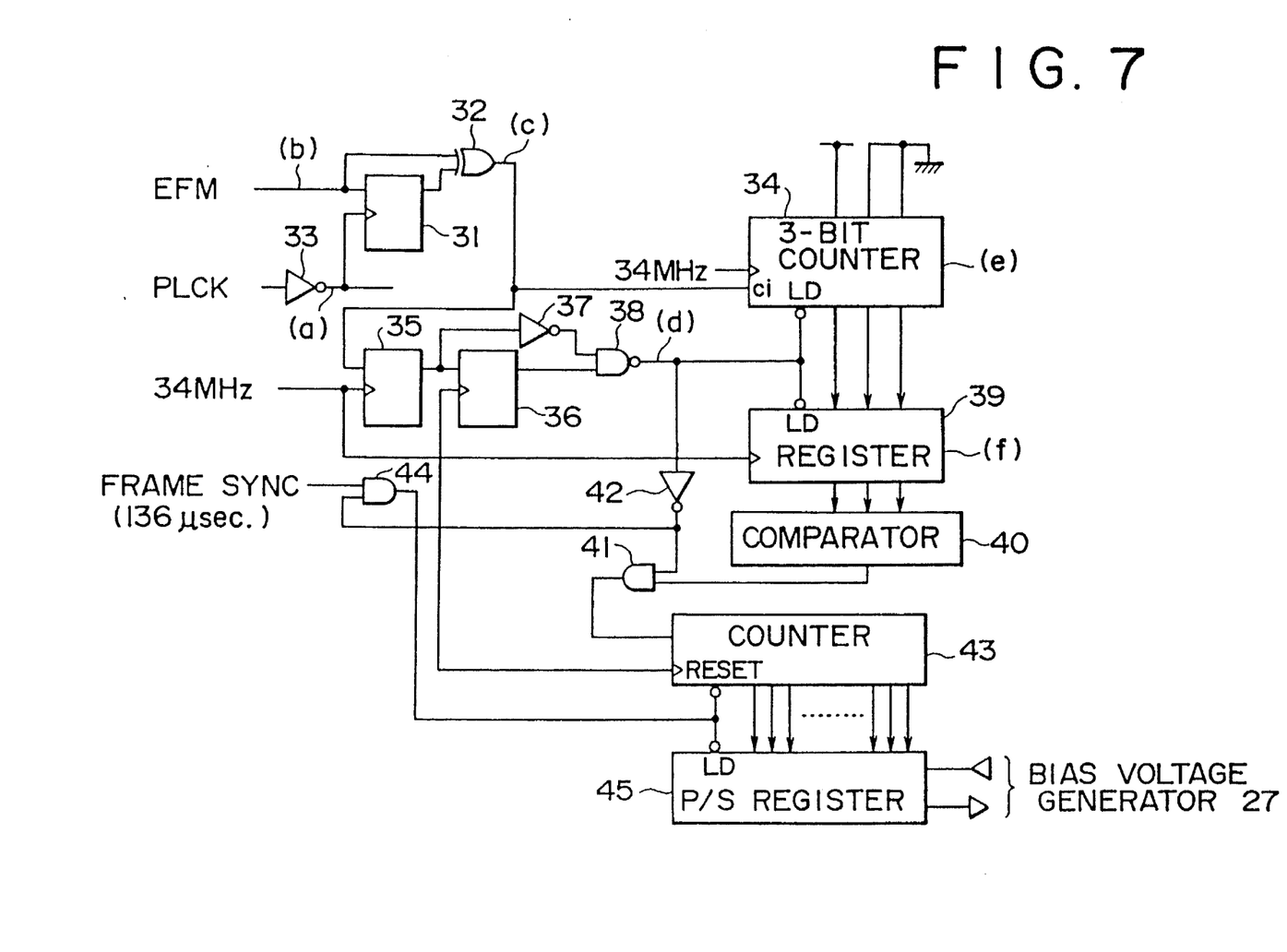
FIG. 7 is a block diagram showing an example of a time difference measuring circuit as a second embodiment of the invention.
Figure 8A:
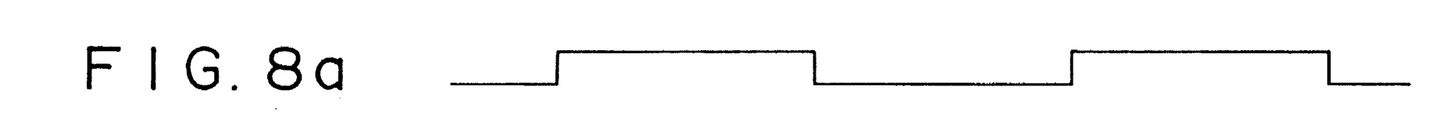
Figure 8B:
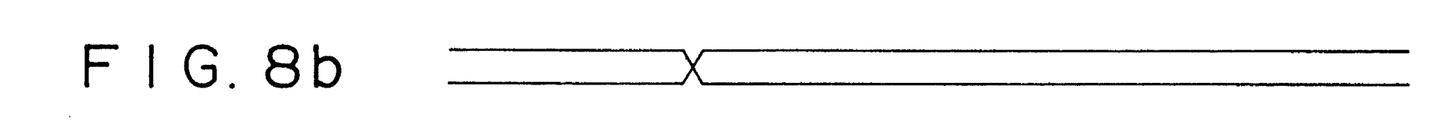
FIG. 8 is a diagram showing waveforms and values in various parts of the time difference measuring circuit shown in FIG. 7 with a single aligned time coordinate for all waveforms running along the horizontal direction.
Figure 8C:
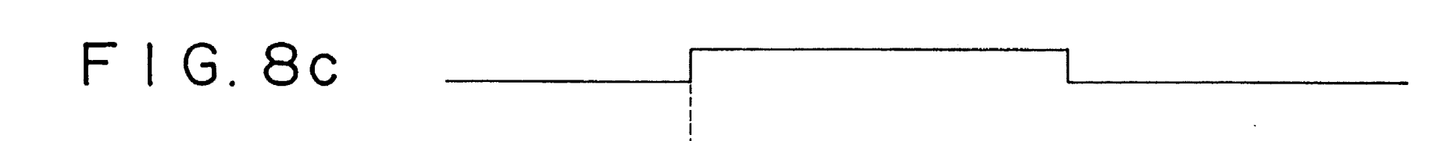
Figure 8D:
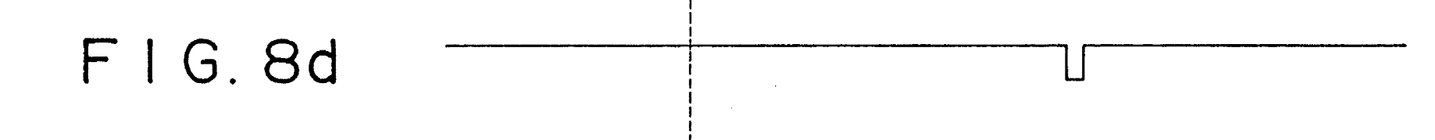
Figure 8E:
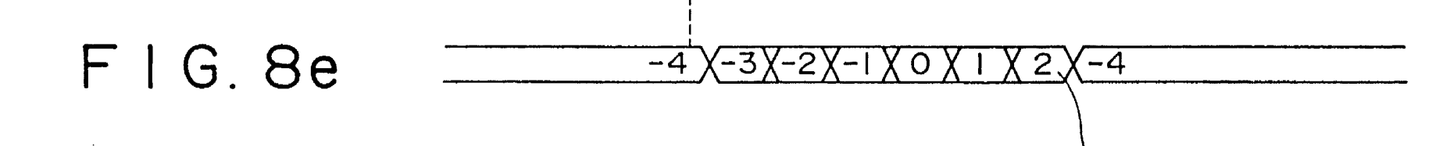
Figure 8F:
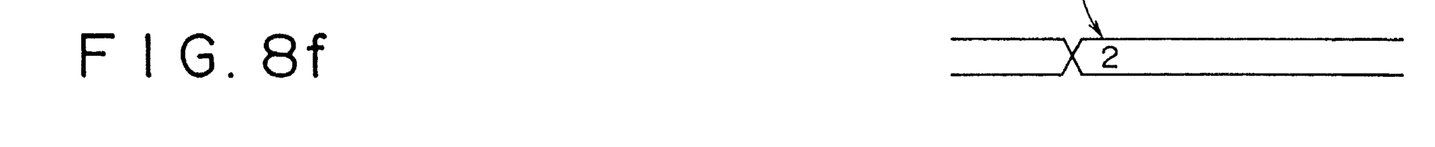

A particular structure of a time difference measuring circuit 26 will be described below as a second embodiment of the invention.

FIG. 7 is a block diagram showing an example of the time difference measuring circuit 26. FIG. 8(a) to FIG. 8(e) show waveforms in the parts (a) to (e) in FIG. 7.

An EFM signal (b) becomes the input to a flip-flop 31 and also becomes one input to an exclusive OR gate 32. The flip-flop 31 is operated by a clock XPCK (a) obtained by inverting the PLL clock PLCK by an invertor 33. The output of the flip-flop 31 becomes the other input to the EX-OR gate 32.

Consequently, the output (c) of the EX-OR gate 32 takes on a high level during the period from the transition point of the EFM signal to the rising edge of the clock XPCK, i.e., the falling edge of the PLL clock PLCK.

The output (c) of the EX-OR gate 32 becomes a ci input to the 3-bit counter 34 and also becomes the input to a flip-flop 35.

The 3-bit counter 34, in which the value of (100) in the twos-complement expression (−4) is loaded as the initial value, counts, while the output (c) of the EX-OR gate 32 is at the high level, the clocks at the frequency 34 MHz (=4.3218 MHz×8). The increment in the count value (e) of the counter 34 corresponds to the time difference $\pm\Delta\theta$ between the transition point of the EFM signal and the falling edge of the PLL clock PLCK.

The output of the flip-flop 35 becomes the input to the flip-flop 36 and also becomes one input to a NAND gate 38 after being inverted by an invertor 37. Both the flip-flops 35 and 36 are operated by the clock 34 mhz. The output of the flip-flop 36 becomes the other input to the NAND gate 38.

The output (d) of the HAND gate 38 becomes the load (LD) input to each of the 3-bit counter 34 and a register 39. In response to this load input (d), the final count of the 3-bit counter 34 is loaded into the register 39 and, at the same time, the aforesaid initial value (100) is loaded into the 3-bit counter 34.

The value (f) loaded into the register 39 becomes a compared input in a comparator 40. The comparator 40 generates an output at a high level when the value of the compared input is equal to or greater than for example ±3. By the numerical value "3", the reference time (±Tref) 88 nsec. given by the above expression (1) is established.

The output of the comparator 40 becomes one input to an AND gate 41. The AND gate 41 receives the inverted output of the output (d) of the NAND gate 38 by an invertor 42 as the other input thereto and supplies the output of the comparator 40 to a counter 43 at the timing of generation of the output (d) of the NAND gate 38.

On the other hand, the output of the invertor 42 becomes one input to an AND gate 44 and the frame sync signal with a period of 136 μsec. becomes the other input to the same. The output of the AND gate 44 becomes the reset input to a counter 43 and further becomes the load input to a P/S (parallel/serial) register 45.

The P/S register 45 converts parallel data loaded from the counter 43 into serial data and, in response to a shift in clock supplied from the bias voltage generator 27, outputs the serial data as shift out data to the bias voltage generator 27.

Figure 9:
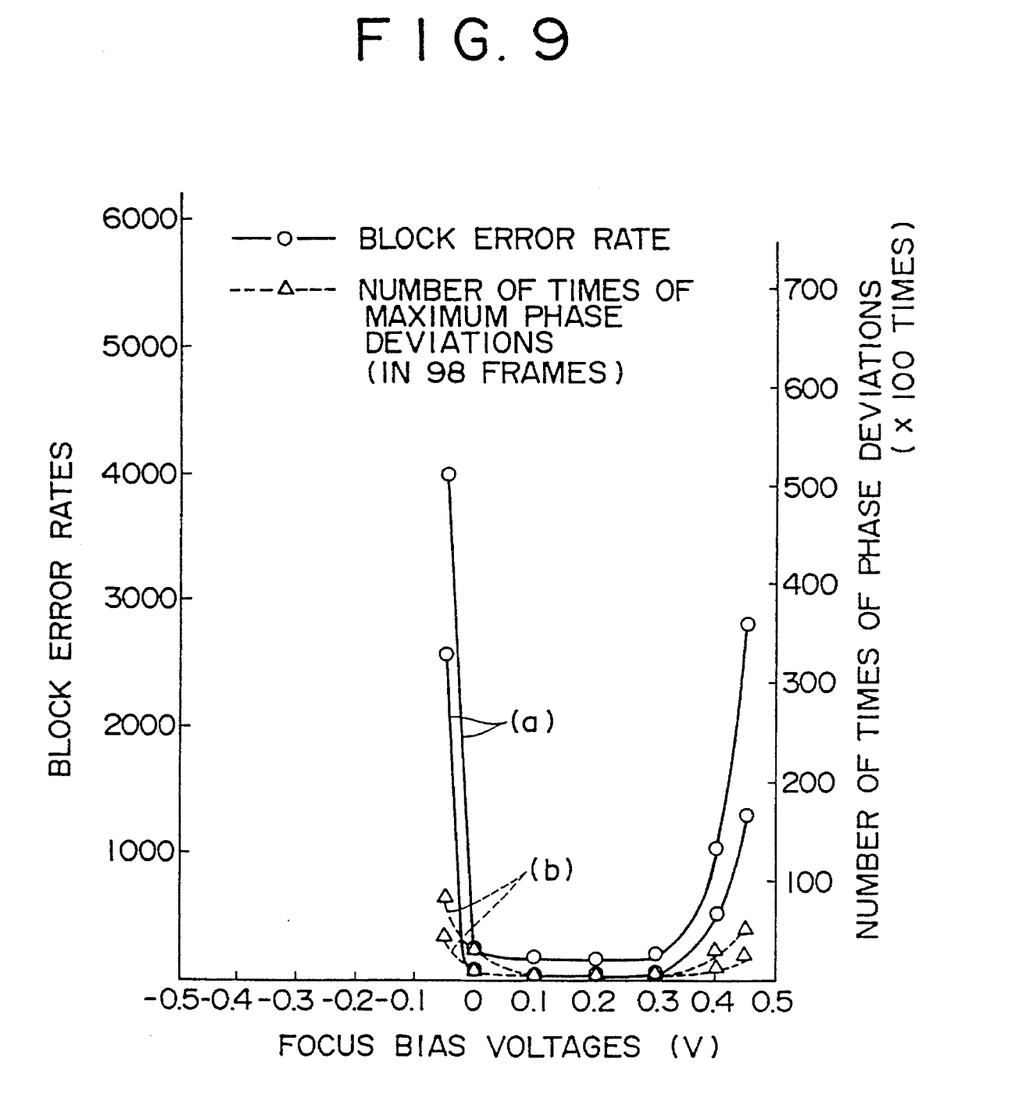
FIG. 9 is a characteristic diagram showing results of measurement of block error rates and the number of times of phase deviations with respect to focus bias voltages.

The number of counts (number of times of phase deviations) obtained by counting transition points of the RF signal deviating ±88 nsec. or more from the nearest rising edge of PLL clock PLCK during a period of 98 frames and the Cl block error rates are shown in FIG. 9 as the results of measurement with the focus bias voltage taken as the parameter. In the diagram, the solid lines (a) indicate the block error rates and the broken lines (b) indicate the number of phase deviations greater than Tref. Frequently observed values are within the regions surrounded by the two solid lines (a) and two broken lines (b).

As apparent from the results of the measurement, a focus bias voltage within the range from 0 to 0.3 V provides good results, and in this region both the Cl block rate and the number of phase deviations are minimized.

A particular example in which a focus bias voltage is established in the bias voltage generator 27 in accordance with the data Npd (the number of phase deviations) measured in the time difference measuring circuit 26 will be described below.

The bias voltage generator 27, constituted of a microcomputer, establishes a focus bias voltage so that the average value of the measured data Npd may become a minimum.

Figure 10:
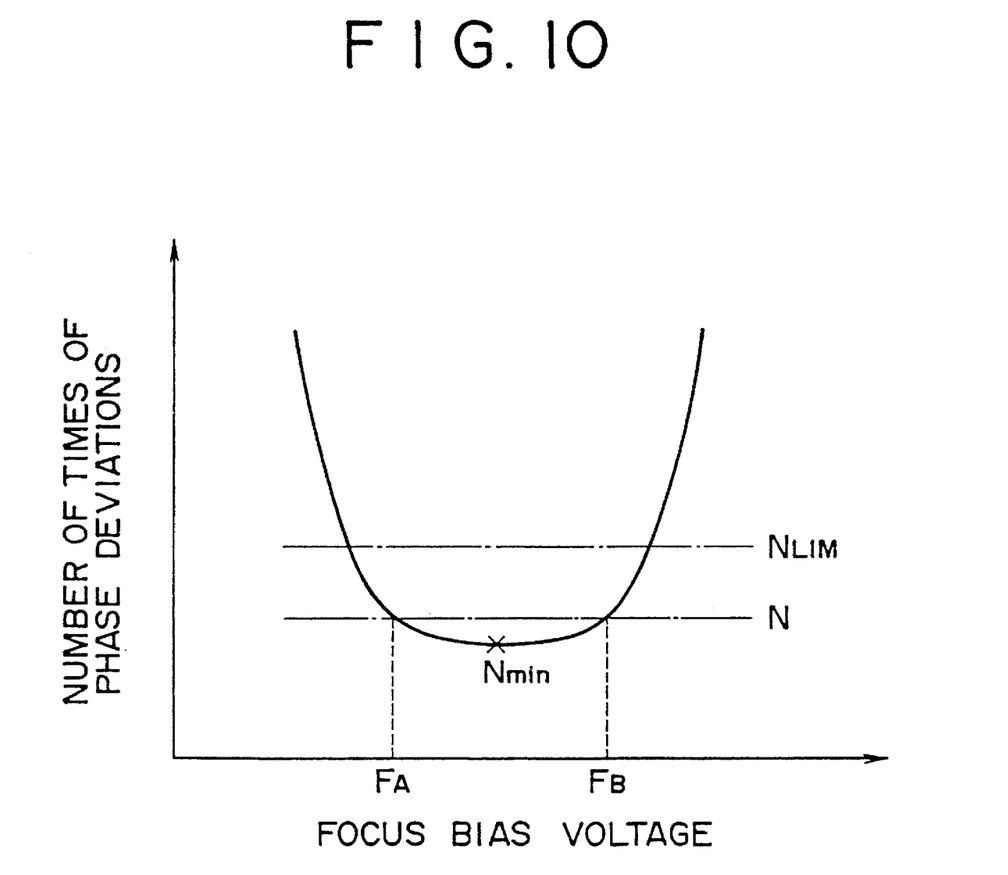
FIG. 10 is a characteristic diagram of focus bias voltage versus the number of phase deviations based on results of measurement.
Figure 11:
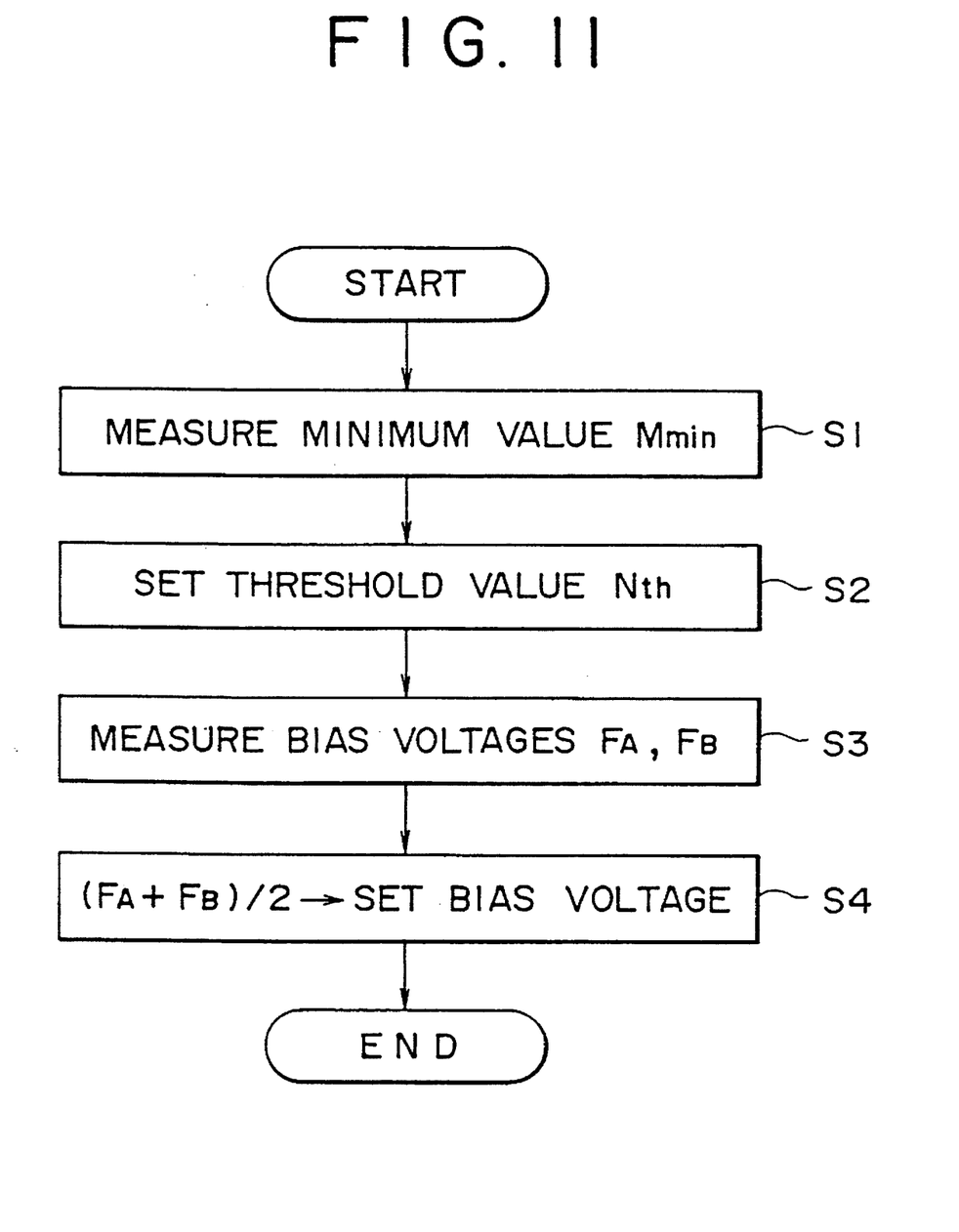
FIG. 11 is a flow chart showing an example of steps followed in establishing a bias voltage.

An example of steps for establishing the bias voltage will be described below according to a flowchart of FIG. 11 based on the characteristic shown in FIG. 10.

First, the minimum value Nmin of the measured data Npd is measured (step S1), and then a threshold value Nth greater than the minimum value Nmin by α% is established (step S2). In establishing the threshold value Nth, it must be set below a limit value Nlim at which it is possible that the focus servo loses its controlling function.

Then, two bias values FA and FB with which the measured data N becomes the threshold value Nth are measured (step S3) and the average value of the two bias values FA and FB is obtained (step S4). This average value is set to be the established focus bias voltage.

As described in the foregoing, according to the present invention, the time difference between an edge of the PLL clock and a transition point of the digital EFM signals is measured, each time the measured time difference becomes equal to or greater than a reference time is detected, and the number of such events detected within a predetermined interval of time is counted in a counter. The count of the counter is outputted as measured data of the time difference, and, then, a focus bias voltage bringing the time difference to a minimum is established. The established bias voltage is added to a focus error signal to thereby cancel an offset component. Thus, the bias adjustments, which have conventionally been performed in the product line, are made automatically attainable.

Further, by the attainment of automatic bias adjustments, the bias adjustments of the focus servo can be made every time a disk is reproduced. Accordingly, the reproduction can be achieved at a bias point most suitable for each disk in spite of variations of the disk in thickness or material.

What is claimed is:

1. A focus servo circuit comprising:
   a focus error signal generator for generating a focus error signal;
   a time difference measuring circuit for measuring a time difference between an edge of a clock synchronized with a digital signal reproduced from a disk and a transition point of the digital signal;
   a bias voltage generator for generating a focus bias voltage determined by the time difference; and
   a processing means for adding the focus bias voltage to the focus error signal to produce an added output signal, wherein
   focus servo is carried out in accordance with the added output signal.

2. A focus servo circuit according to claim 1, wherein the time difference measuring circuit includes a circuit for measuring a time difference between an edge of the clock and a transition point of the digital signal, a circuit for detecting as an event each time the measured time difference becomes equal to or greater than a reference time, and a counter for counting the number of said events detected within a predetermined interval of time, wherein count data of the counter is outputted as measured data of the time difference.

3. A focus servo circuit according to claim 2, wherein the bias voltage generator establishes the focus bias voltage so that the average value of the measured data becomes a minimum.

4. A focus servo circuit according to claim 2, wherein the bias voltage generator measures a minimum value of the measured data, establishes a threshold value greater than the minimum value by a predetermined value, measures two bias values with which said measured data becomes the threshold value, and establishes the average value of the two bias values as the focus bias voltage.

5. A disk player apparatus comprising:
   a pick up means for receiving a signal from a disk;
   a signal generating means for generating a focus error signal,
   a time measuring means for measuring a time difference between an edge of a clock synchronized with a digital signal reproduced from the disk and a transition point of the digital signal,
   control signal means for generating a focus bias signal corresponding to the time difference,
   a processing means for processing the focus error signal and the focus bias signal to produce an output signal; and
   a phase control means for compensating the output signal from said processing means and controlling the pickup means in response to the output signal.

6. A disk player apparatus according to claim 5, wherein the time measuring means has a circuit for detecting as measured data the number of instances wherein the measured time difference becomes equal to or greater than a reference time, and a counter means for counting a number of the measured data within a predetermined interval of time.

7. A disk player apparatus according to claim 5 wherein the control signal means generates a bias voltage which causes an average value of the measured data to become a minimum, said bias voltage being used to control the pick up means.

8. A disk player apparatus according to claim 5 wherein the control signal means measures a minimum value of the measured data, establishes a threshold value greater than the minimum value, measures two bias values with which the measured data become equal to the threshold value, and establishes the average value of the two bias values as the focus control signal.

* * * * *